United States Patent
Kyosuna et al.

(10) Patent No.: US 11,368,217 B2
(45) Date of Patent: Jun. 21, 2022

(54) RECEIVING DEVICE, COMMUNICATION SYSTEM, RECEIVING METHOD, AND COMPOSITE IMAGE GENERATION PROGRAM

(71) Applicant: NEC Corporation, Tokyo (JP)

(72) Inventors: Satoshi Kyosuna, Tokyo (JP); Yoichiro Mizuno, Tokyo (JP); Koya Takata, Tokyo (JP); Satoshi Komatsu, Kanagawa (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 252 days.

(21) Appl. No.: 16/635,854

(22) PCT Filed: Aug. 1, 2017

(86) PCT No.: PCT/JP2017/027869
§ 371 (c)(1),
(2) Date: Jan. 31, 2020

(87) PCT Pub. No.: WO2019/026175
PCT Pub. Date: Feb. 7, 2019

(65) Prior Publication Data
US 2020/0366369 A1    Nov. 19, 2020

(51) Int. Cl.
*H04B 10/00* (2013.01)
*H04B 10/112* (2013.01)
(Continued)

(52) U.S. Cl.
CPC ............ *H04B 10/112* (2013.01); *G06T 11/00* (2013.01); *H04B 10/502* (2013.01); *H04B 10/548* (2013.01); *H04B 10/67* (2013.01)

(58) Field of Classification Search
CPC ... H04B 10/11; H04B 10/112; H04B 10/1123; H04B 10/114; H04B 10/1143;
(Continued)

(56) References Cited

U.S. PATENT DOCUMENTS

| 8,515,294 B2 * | 8/2013 | Britz ............... H04B 10/60 398/212 |
| 2008/0056723 A1 | 3/2008 | Giles et al. |

(Continued)

FOREIGN PATENT DOCUMENTS

| JP | 09-051309 A | 2/1997 |
| JP | 2011-061267 A | 3/2011 |

(Continued)

OTHER PUBLICATIONS

Japanese Office Action for JP Application No. 2019-533773 dated Sep. 15, 2021 with English Translation.
(Continued)

*Primary Examiner* — Hanh Phan
(74) *Attorney, Agent, or Firm* — Sughrue Mion, PLLC

(57) ABSTRACT

This communication system includes: at least one transmitter which emits signal light; and a receiving device which receives the signal light. The receiving device is provided with: a control unit which generates a phase image on the basis of position information indicating a position of the transmitter, and combines a virtual lens image with the phase image to generate a composite image; a phase-modulation spatial light modulating element which receives the composite image and diffracts and collects signal light; and a detector which receives the diffracted and collected signal light.

16 Claims, 12 Drawing Sheets

(51) Int. Cl.
*G06T 11/00* (2006.01)
*H04B 10/50* (2013.01)
*H04B 10/548* (2013.01)
*H04B 10/67* (2013.01)

(58) Field of Classification Search
CPC .. H04B 10/1149; H04B 10/116; H04B 10/40; H04B 10/502; H04B 10/548; H04B 10/504; H04B 10/60; H04B 10/67
USPC ....... 398/183, 188, 118, 119, 127, 128, 129, 398/130, 131, 135, 136, 202, 208, 209, 398/212, 158, 159, 33, 38
See application file for complete search history.

(56) References Cited

U.S. PATENT DOCUMENTS

2014/0355985 A1  12/2014  Chu et al.
2015/0349881 A1* 12/2015  Byers ................. H04B 10/1123
                                                          398/38
2617/0264365       9/2017  Takahashi et al.

FOREIGN PATENT DOCUMENTS

| JP | 2014-512569 A | 5/2014 |
| JP | 2016-088318 A | 5/2016 |
| WO | 2016/088318 A1 | 6/2016 |

OTHER PUBLICATIONS

International Search Report for PCT/JP2017/027869 dated Oct. 24, 2017 [PCT/ISA/210].
Written Opinion for PCT/JP2017/027869 dated Oct. 24, 2017 [PCT/ISA/237].

* cited by examiner

310

320

330

RECEIVING DEVICE, COMMUNICATION SYSTEM, RECEIVING METHOD, AND COMPOSITE IMAGE GENERATION PROGRAM

CROSS REFERENCE TO RELATED APPLICATIONS

This application is a National Stage of International Application No. PCT/JP2017/027869 filed Aug. 1, 2017.

TECHNICAL FIELD

This invention relates to a receiving device, a communication system, a receiving device, and a composite image generation program.

BACKGROUND ART

Wireless communication systems using light are known. As such a wireless communication system, Patent Literature 1 describes one example of vehicle-to-vehicle communication that is carried out by wireless communication using light. Patent Literature 1 discloses a vehicle-to-vehicle communication system which is capable of reliably transmitting information of a particular vehicle to another vehicle by means of the wireless communication using light. The vehicle-to-vehicle communication system of Patent Literature 1 comprises a forward projection/reception unit for transmitting/receiving a laser optical signal to/from a forward vehicle, a backward projection/reception unit for transmitting/receiving a laser optical signal to/from a backward vehicle, and signal relay means for carrying out relay of signals between the forward projection/reception unit and the backward projection/reception unit.

Patent Literature 2 discloses a beam routing apparatus comprising a phase-modulation spatial light modulator such as LCOS (Liquid Crystal on Silicon) although it is not the wireless communication system using light.

CITATION LIST

Patent Literature

PTL 1: JP H09-51309 A
PTL 2: JP 2014-512569 A

SUMMARY OF THE INVENTION

Technical Problem

In mobile communication using light, in a case where communication having high directivity is carried out by using a laser or the like in order to avoid interference with other transmission/reception units, it is necessary to match alignment (an optical axis) between the transmission/reception units. However, it is generally necessary to use a mechanical gimbal or the like in order to match the alignment. As a result, there is a problem that a device may be increased in size and cost.

In order to resolve this problem, it is conceivable that the transmission/reception unit is provided with a phase-modulation spatial light modulating element which electrically carries out directional control of light. However, when the phase-modulation spatial light modulating element is used in reception, a focal distance theoretically becomes infinity (Fraunhofer region). As a result, there is a problem that a receiving device is increased in size. In order to resolve this, it is conceivable to shorten the focal distance by providing a Fourier transform lens at a latter part of the phase-modulation spatial light modulating element, as in Patent Literature 2. However, in this event, there is a problem that the receiving device is increased in size and cost correspondingly with provision of the Fourier transform lens.

Furthermore, when the phase-modulation spatial light modulating element is used in transmission/reception, communication is impossible if polarization of the phase-modulation spatial light modulating element and polarization of the light do not match each other. Accordingly, in a case where it is applied to the mobile communication, there arises a new problem that communication may become impossible if a relative position between the transmitting unit and the receiving unit or posture of the transmitting unit or the receiving unit changes.

It is an object of this invention to provide a receiving device, a communication system, a receiving method, and a composite image generation program which are capable of resolving the above-mentioned problems.

Solution to Problem

A receiving device according to a first aspect of the present invention is configured to receive signal light emitted from a transmitter, and comprises a control unit configured to generate a phase image on the basis of position information indicating a position of the transmitter, and to combine the phase image with a virtual lens image to generate a composite image; a phase-modulation spatial light modulating element configured to diffract and collect the signal light in response to the composite image supplied thereto; and a detector configured to receive the diffracted and collected signal light.

A communication system according to a second aspect of the present invention comprises the receiving device according to the first aspect; and at least one transmitter configured to emit signal light to the receiving device.

A receiving method according to a third aspect of the present invention is for receiving signal light emitted from a transmitter, and comprises generating a phase image on the basis of position information indicating a position of the transmitter, combining the phase image with a virtual lens image to generate a composite image, and supplying the composite image to a phase-modulation spatial light modulating element; diffracting and collecting the signal light in the phase-modulation spatial light modulating element; and receiving, in a detector, the diffracted and collected signal light.

A composite image generation program according to a fourth aspect of the present invention is a composite image generation program for making a computer generate a composite image. The computer controls, in a receiving device configured to receive signal light emitted from a transmitter, an operation of a phase-modulation spatial light modulating element for diffracting and collecting the signal light. The composite image generation program makes the computer execute generation processing for generating a phase image on the basis of position information indicating a position of the transmitter and combining the phase image with a virtual lens image to generate a composite image, and supplying processing for supplying the composite image to the phase-modulation spatial light modulating element.

A receiving device according to a fifth aspect of the present invention is configured to receive circularly polarized signal light emitted from a transmitter, and comprises a polarizing element configured to convert the circularly polarized signal light into linearly polarized signal light; a control unit configured to generate a phase image on the basis of position information indicating a position of the transmitter, and to combine the phase image with a virtual lens image to generate a composite image; a phase-modulation spatial light modulating element configured to diffract and collect the linearly polarized signal light in response to the composite image supplied thereto; and a detector configured to receive the diffracted and collected linearly polarized signal light. The polarizing element is configured to convert the circularly polarized signal light into the linearly polarized signal light so as to coincide with a polarizing direction of the phase-modulation spatial light modulating element.

A communication system according to a sixth aspect of the present invention comprises the receiving device according to the fifth aspect; and at least one transmitter configured to emit circularly polarized signal light to the receiving device.

A receiving method according to a seventh aspect of the present invention is for receiving circularly polarized signal light emitted from a transmitter and comprises converting the circularly polarized signal light into linearly polarized signal light having a direction which coincides with a polarization direction of a phase-modulation spatial light modulating element; generating a phase image on the basis of position information indicating a position of the transmitter, combining the phase image with a virtual lens image to generate a composite image, and supplying the composite image to the phase-modulation spatial light modulating element; diffracting and collecting the linearly polarized signal light in the phase-modulation spatial light modulating element; and receiving, in a detector, the diffracted and collected linearly polarized signal light.

A receiving device according to an eighth aspect of the present invention is configured to receive circularly polarized signal light emitted from a transmitter, and comprises a polarizing element configured to convert the circularly polarized signal light into linearly polarized signal light; a control unit configured to generate a phase image on the basis of position information indicating a position of the transmitter; a phase-modulation spatial light modulating element configured to diffract and collect the linearly polarized signal light in response to the phase image supplied thereto; and a detector configured to receive the diffracted and collected linearly polarized signal light. The polarizing element is configured to convert the circularly polarized signal light into the linearly polarized signal light so as to coincide with a polarization direction of the phase-modulation spatial light modulating element.

A communication system according to a ninth aspect of the present invention comprises the receiving device according to the eighth aspect; and at least one transmitter configured to emit circularly polarized signal light to the receiving device.

A receiving method according to a tenth aspect of the present invention is for receiving circularly polarized signal light emitted from a transmitter, and comprises converting the circularly polarized signal light into signal light with linearly polarized signal light having a direction which coincides with a polarization direction of a phase-modulation spatial light modulating element; generating a phase image on the basis of position information indicating a position of the transmitter, and supplying the phase image to the phase-modulation spatial light modulating element; diffracting and collecting the linearly polarized signal light in the phase-modulation spatial light modulating element; and receiving the diffracted and collected linearly polarized signal light.

Advantageous Effects of the Invention

According to this invention, it is possible to provide a receiving device, a communication system, a receiving method, and a composite image generation program, which are capable of shortening a distance between a phase-modulation spatial light modulating element and a detector.

In addition, according to this invention, it is possible to provide a receiving device, a communication system, a receiving method, and a composite image generation program, which are capable of communicating without depending on a relative position between a transmitter and a receiving device and on a posture of the transmitter or the receiving device.

BRIEF DESCRIPTION OF THE DRAWINGS

FIG. 3A is a phase image, FIG. 3B is a virtual lens image, and FIG. 3C is a composite image of the phase image and the virtual lens image;

DESCRIPTION OF EMBODIMENTS

Now, with reference to the drawings, example embodiments of the present invention will be described in detail. In the respective drawings, the same or corresponding parts are depicted by the same reference signs and the description thereof is omitted as appropriate. Each one-way arrow which may be illustrated in the respective drawings represents one example of a flow of a signal (data) but does not limit a direction of the flow of the signal (data).

First Example Embodiment

Figure 1:
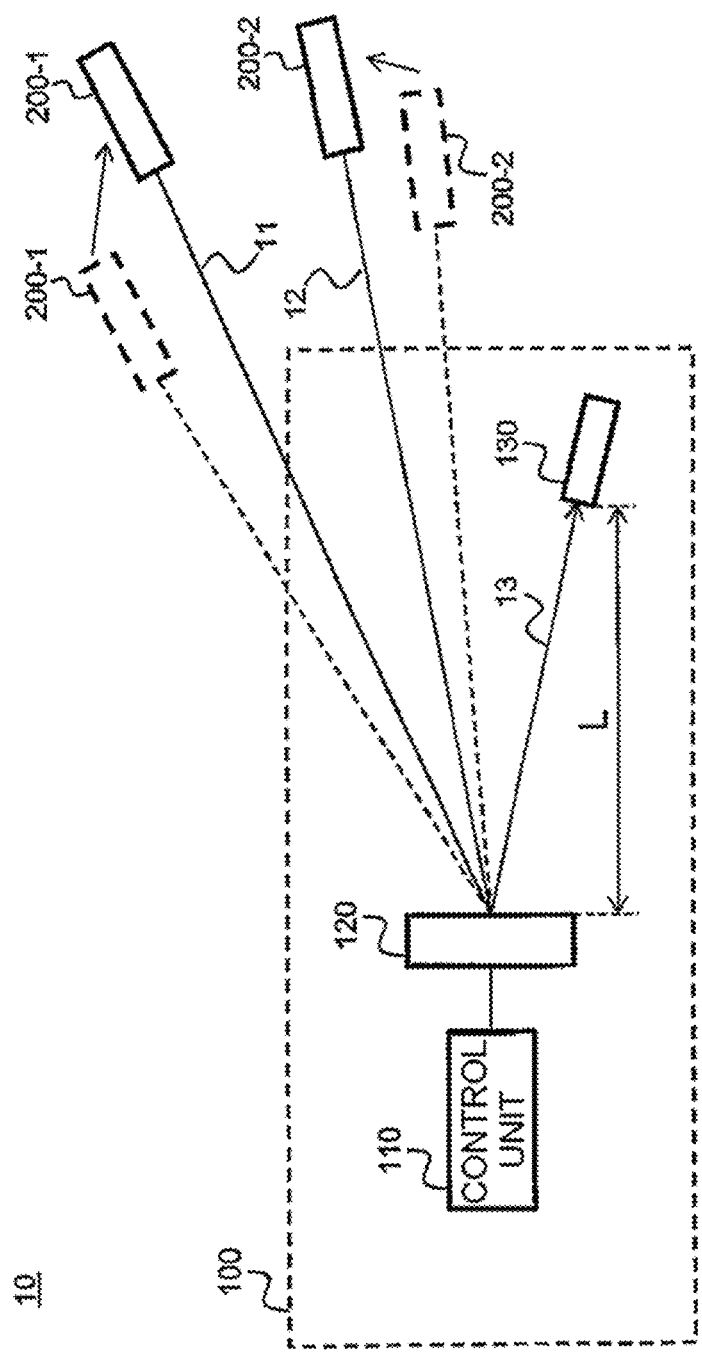
FIG. 1 is a schematic diagram for illustrating a configuration of a communication system according to a first example embodiment of the present invention.

FIG. 1 is a schematic diagram for illustrating a configuration of a communication system according to a first example embodiment of the present invention. As shown in FIG. 1, the communication system 10 comprises a receiving device 100, a first transmitter 200-1, and a second transmitter 200-2. The configuration illustrated in FIG. 1 is exemplification and the communication system may comprise at least N transmitters (where N is an integer which is not less than one) in this example embodiment.

The receiving device 100 receives rays of signal light emitted from the first transmitter 200-1 and the second transmitter 200-2, respectively.

The first transmitter 200-1 emits first signal light 11 toward the receiving device 100 whereas the second transmitter 200-2 emits second signal light 12 toward the receiving device 100. As each of light sources for emitting the first signal light 11 and the second signal light 12, for example, a laser light source for emitting a laser beam or an LED (Light Emitting Diode) may be used. In FIG. 1, the first transmitter 200-1 and the second transmitter 200-2, each of which is depicted by a dotted line, indicate transmitters before movement whereas the first transmitter 200-1 and the second transmitter 200-2, each of which is depicted by a solid line, indicate transmitters after movement. That is, the first transmitter 200-1 and the second transmitter 200-2 comprise mobile transmitters. The first transmitter 200-1 and the second transmitter 200-2 may comprise transmitters whose positions are fixed.

Specifically, the receiving device 100 comprises a control unit 110, a phase-modulation spatial light modulating element 120, and a detector 130.

The control unit 110 generates a phase image on the basis of position information indicating positions of the first transmitter 200-1 and the second transmitter 200-2. In addition, the control unit 110 generates a composite image by combining the phase image with a virtual lens image. Herein, in the present specification, the "virtual lens image" means an image for controlling a diffraction pattern of the phase-modulation spatial light modulating element 120 so as to shorten a focal distance of diffracted light caused by the phase-modulation spatial light modulating element 120. Specifically, by combining the phase image with the virtual lens image and by controlling the phase-modulation spatial light modulating element 120, it is possible to simultaneously achieve directional control on the basis of the position information of the transmitters and shortening of the focal distance of the diffracted light caused by the phase-modulation spatial light modulating element 120. That is, the virtual lens image, which is combined with the phase image so as to shorten the focal distance of the diffracted light caused by the phase-modulation spatial light modulating element 120, serves as an imaginary lens (a virtual lens) provided between the phase-modulation spatial light modulating element 120 and the detector 130. Therefore, in this example embodiment, the image, which is combined with the phase image so as to shorten the focal distance of the diffracted light caused by the phase-modulation spatial light modulating element 120, is called the "virtual lens image." Although the Fourier transform lens is provided in Patent Literature 2, an optical system such as a Fourier transform lens is unnecessary in this example embodiment. Furthermore, the control unit 110 supplies the generated composite image to the phase-modulation spatial light modulating element 120. Such a control unit 110 may be configured by an electronic circuit or the like. A specific configuration of the control unit 110 will be discussed later.

The phase-modulation spatial light modulating element 120 receives the composite image from the control unit 110. In addition, the phase-modulation spatial light modulating element 120 diffracts and collects, toward the detector 130, the first signal light 11 and the second signal light 12 emitted from the first transmitter 200-1 and the second transmitter 200-2, respectively. Specifically, under the control of the control unit 110, the phase-modulation spatial light modulating element 120 selectively diffracts and collects the signal light emitted from one of the first transmitter 200-1 and the second transmitter 200-2 which is a partner wishing to communicate. The first signal light 11 and the second signal light 12 may be simultaneously collected by combining a multiple access communication method such as time division multiple access (TDMA; Time Division Multiple Access). Thus, the detector 130 can detect the diffracted and collected signal light. In a case where the virtual lens image is not supplied (in other words. in a case where the phase image alone is supplied), the signal light diffracted by the phase-modulation spatial light modulating element 120 forms an image in a Fraunhofer region without being collected. Thus, a distance L between the phase-modulation spatial light modulating element 120 and the detector 130 becomes infinity. However, in this example embodiment, the composite image obtained by combining the virtual lens image with the phase image is supplied. Therefore, it is possible to make the distance L between the phase-modulation spatial light modulating element 120 and the detector 130 be a short distance, for example, on the order of cm or less.

The phase-modulation spatial light modulating element 120 may be implemented by an element which uses, for example, a ferroelectric liquid crystal, a homogenous liquid crystal, and a homeotropic liquid crystal. Specifically, the phase-modulation spatial light modulating element 120 can be implemented by an LCOS (Liquid Crystal on Silicon). The phase-modulation spatial light modulating element 120 may be implemented, for example, by an MEMS (Micro Electro Mechanical System).

Figure 2:
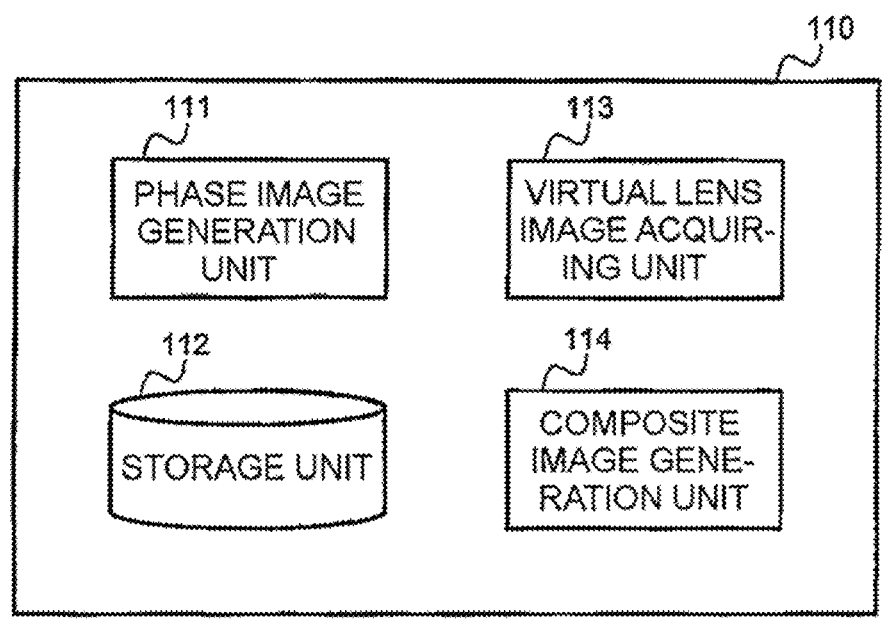
FIG. 2 is a block diagram for illustrating a configuration of a control unit equipped in a receiving device according to the first example embodiment of the present invention.

Next referring to FIG. 2, description will proceed to a configuration of the control unit 110 equipped in the receiving device 100 according to this example embodiment. FIG. 2 is a block diagram for illustrating the configuration of the control unit 110. As shown in FIG. 2, the control unit 110 comprises a phase image generation unit 111, a storage unit 112, a virtual lens image acquiring unit 113, and a composite image generation unit 114.

The phase image generation unit 111 generates the phase image from an original image on the basis of the position information of the transmitters. In this event, a method of acquiring the position information of the transmitters is not limited. For example, the receiving device 100 may comprise a position information acquiring unit which is not shown, and the position information acquiring unit may acquire the position information of the transmitters. In this case, the position information acquiring unit acquires the position information of the respective transmitters using, for example, a well-known technique. Specifically, the position information acquiring unit may acquire the position information of the respective transmitters, for example, from a GPS (Global Positioning System) or a navigation system.

The storage unit 112 holds the virtual lens image to be combined with the phase image. Although the storage unit 112 is provided within the control unit 110, it may be provided, within the receiving device 100, independently as a different part from the control unit 110. In addition, the storage unit 112 may be provided outside the receiving device 100. Such a storage unit 112 may comprise a buffer or a storage memory.

The virtual lens image acquiring unit 113 acquires, from the storage unit 112, the virtual lens image to be combined with the phase image.

The composite image generation unit 114 generates the composite image by combining the phase image with the virtual lens image acquired by the virtual lens image acquiring unit 113. In addition, the composite image generation unit 114 supplies the generated composite image to the phase-modulation spatial light modulating element 120.

Figure 3A:
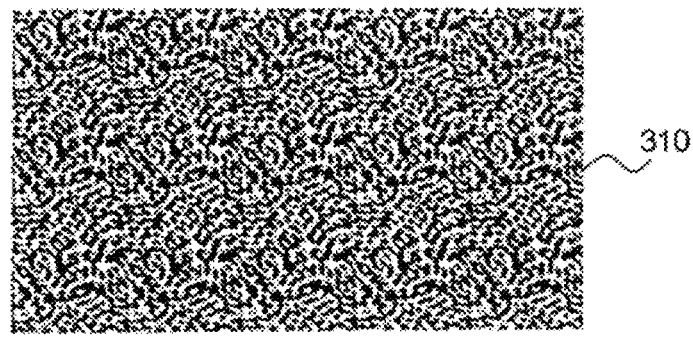
FIGS. 3A to 3C are views for illustrating images generated by the receiving device according to the first example embodiment of the present invention, where
Figure 3B:
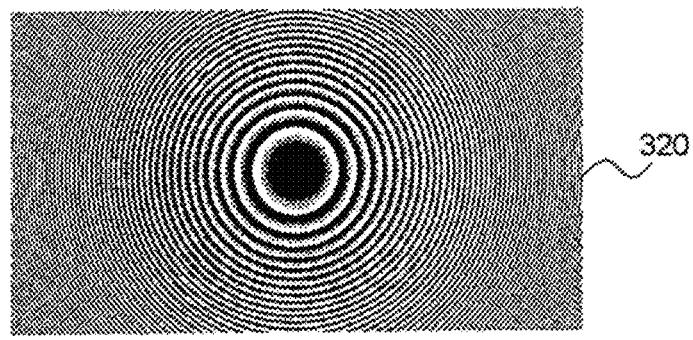
Figure 3C:
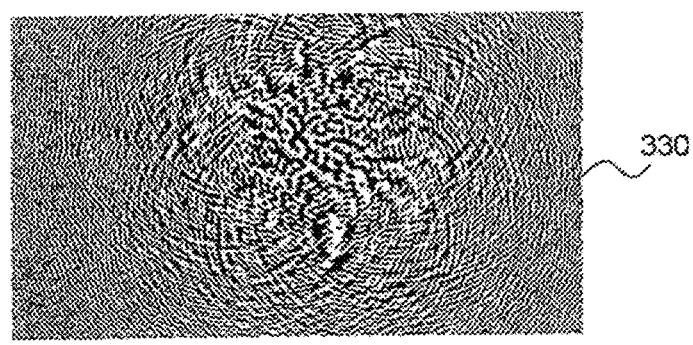

Referring to FIG. 3, description will proceed to an example of the composite image. FIG. 3A represents an example of the phase image generated by the phase image generation unit 111. FIG. 3B represents an example of the virtual lens image held in the storage unit 112. FIG. 3C represents an example of the composite image generated by the composite image generation unit 114.

The phase image generation unit 111 supplies the generated phase image 310 to the composite image generation unit 114. The virtual lens image acquiring unit 113 acquires, from the storage unit 112, the virtual lens image 320 to be combined with the phase image 310 and supplies the acquired virtual lens image 320 to the composite image generation unit 114. Then, the composite image generation unit 114 combines the phase image 310 with the virtual lens image 320 to generate the composite image 330. The phase-modulation spatial light modulating element 120 supplied with the composite image 330 selectively diffracts and collects the first signal light 11 and the second signal light 12 which are incident thereto, so that the diffracted light 13 can form an image at a short distance on the order of cm or less from the phase-modulation spatial light modulating element 120.

Operation of Communication System According to the First Example Embodiment

Figure 4:
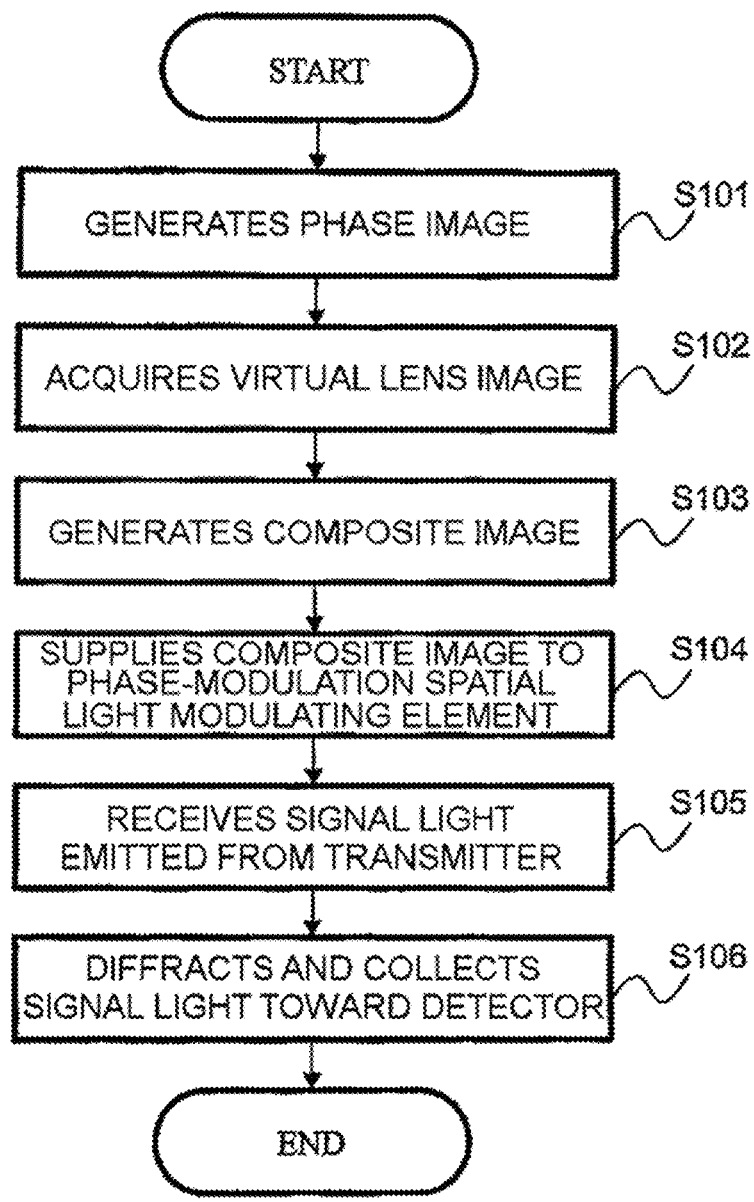
FIG. 4 is a flow chart for illustrating a flow of an operation of the communication system according to the first example embodiment of the present invention.

FIG. 4 is a flow chart for illustrating a flow of an operation of the communication system according to the first example embodiment of the present invention. Referring now to FIGS. 1 and 4, description will proceed to the flow of the operation of the communication system.

First, the control unit 110 generates the phase image on the basis of the position information of the first transmitter 200-1 and the second transmitter 200-2 (step S101).

Next, the control unit 110 acquires the virtual lens image to be combined with the phase image (step S102). Subsequently, the control unit 110 combines the phase image with the virtual lens image to generate the composite image (step S103). In addition, the control unit 110 supplies the generated composite image to the phase-modulation spatial light modulating element 120 (step S104).

Next, the phase-modulation spatial light modulating element 120 receives the first signal light 11 and the second signal light 12 emitted from the first transmitter 200-1 and the second transmitter 200-2 (step S105). Then, the phase-modulation spatial light modulating element 120 selectively diffracts and collects the first signal light 11 and the second signal light 12 toward the detector 130 (step S106).

[Operation of Control Unit]

Figure 5:
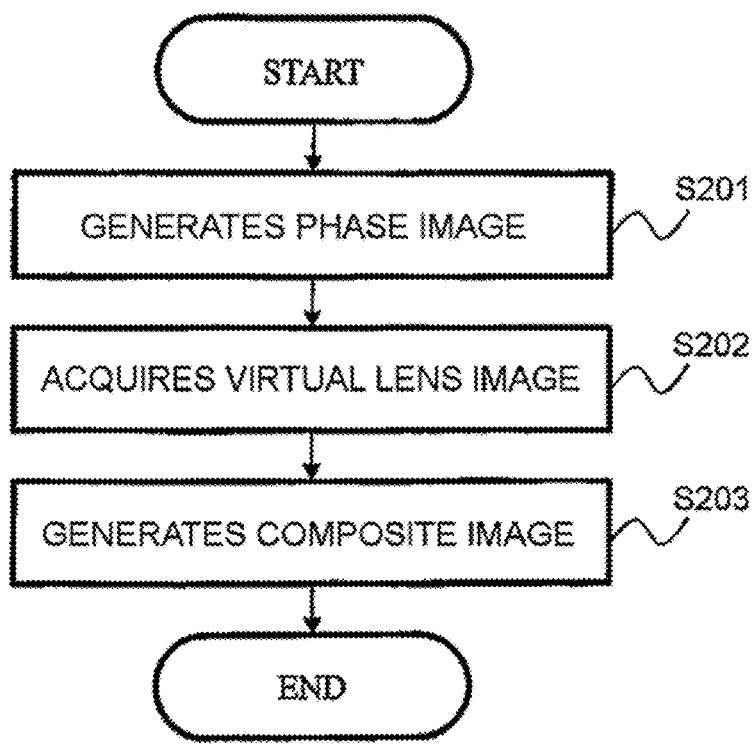
FIG. 5 is a flow chart for illustrating a flow of an operation of the control unit equipped in the receiving device according to the first example embodiment of the present invention.

FIG. 5 is a flow chart for illustrating a flow of an operation of generating the composite image by the control unit. Referring now to FIGS. 1, 2 and 5, description will proceed to the flow of the operation of generating the composite image by the control unit.

First, the phase image generation unit 111 generates the phase image on the basis of the position information of the first transmitter 200-1 and the second transmitter 200-2 each of which emits the signal light (step S201). Next, the virtual lens image acquiring unit 113 acquires, from the storage unit 112, the virtual lens image to be combined with the phase image generated by the phase image generation unit 111 (step S202). Subsequently, the composite image generation unit 114 combines the phase image generated by the phase image generation unit 112 with the virtual lens image acquired by the virtual lens image acquiring unit 113 to generate the composite image (step S203).

As described above, the receiving device 100 according to the first example embodiment has a configuration of combining the phase image with the virtual lens image and, therefore, can be a small-sized receiving device which comprises no optical system between the phase-modulation spatial light modulating element 120 and the detector 130. Although the phase-modulation spatial light modulating element 120 is of a reflection type in the receiving device 100 according to the first example embodiment, the phase-modulation spatial light modulating element 120 may be of a transmission type. In this case, the transmission-type phase-modulation spatial light modulating element 120 selectively transmits, diffracts, and collects the first signal light 11 and the second signal light 12 emitted from the first transmitter 200-1 and the second transmitter 200-2.

[Modification of Communication System]

Figure 6:
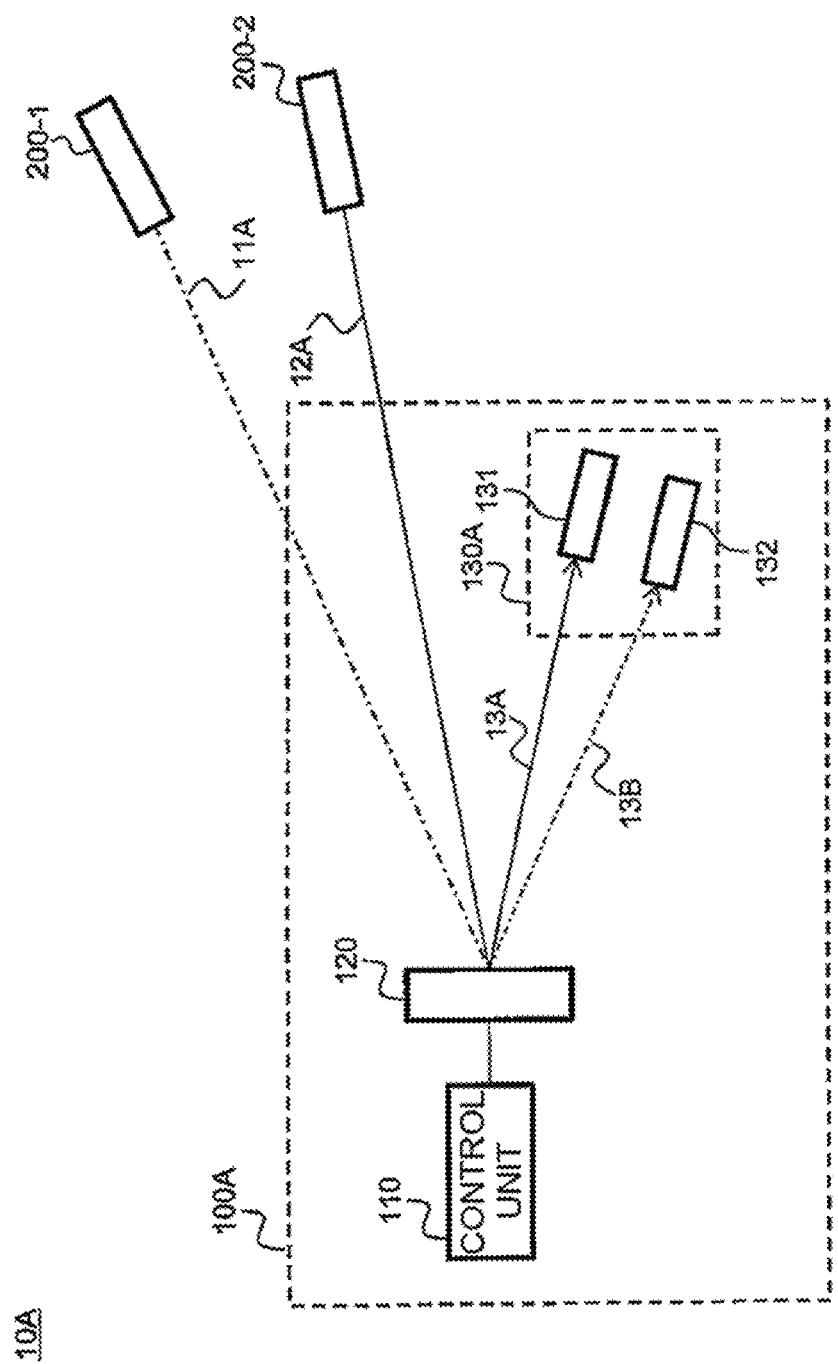
FIG. 6 is a schematic diagram for illustrating a configuration of a modification of the receiving device according to the first example embodiment of the present invention.

FIG. 6 is a schematic diagram of a communication system 10A as a modification according to the first example embodiment of the present invention. In the communication system 10A, a receiving device 100A comprises the control unit 110, the phase-modulation spatial light modulating element 120, and a detector 130A.

The detector 130A comprises a first detection unit 131 and a second detection unit 132. The first detection unit 131 and the second detection unit 132 receive rays of signal light having wavelength regions which are different from each other, respectively. That is, in a case where first signal light 11A and second signal light 12A have different wavelengths, the receiving device 100A according to the modification of the first example embodiment may be configured to receive them by different detectors, respectively. In this event, the phase-modulation spatial light modulating element 120 collects first diffracted light 13A obtained by diffracting the first signal light 11A to the first detection unit 131 and collects second diffracted light 13B obtained by diffracting the second signal light 12A to the second detection unit 132.

[Modification of Receiving Device]

Figure 7:
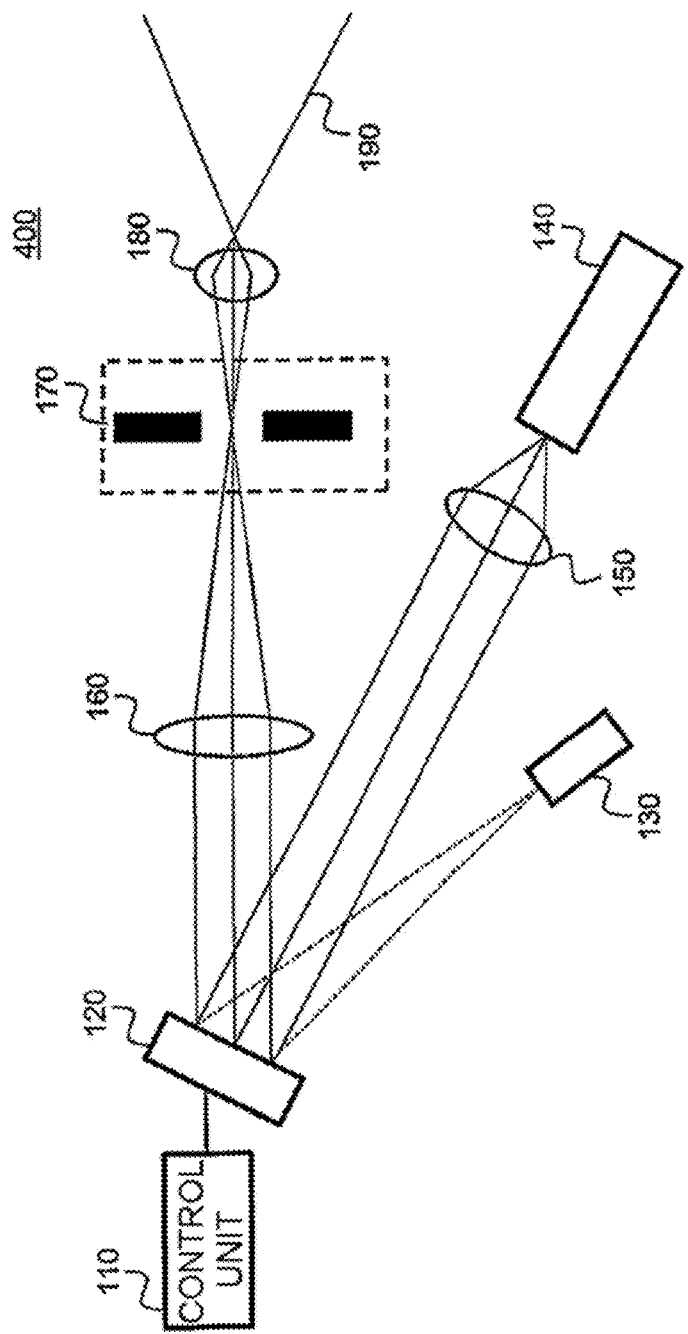
FIG. 7 is a schematic diagram for illustrating a configuration of a communication system of a transmission/reception integrated model.

FIG. 7 is a schematic view of a modification of the receiving device 100 of the first example embodiment. The modification of the receiving device 100 comprises a transmitting/receiving device 400 obtained by giving a transmitting function to the receiving device 100. The transmitting/receiving device 400 comprises the control unit 110, the phase-modulation spatial light modulating element 120, the detector 130, a laser light source 140, a collimator lens 150, a Fourier transform lens 160, an aperture 170, and a projection lens 180.

The laser light source 140 emits laser light toward the phase-modulation spatial light modulating element 120. The laser light source 140 may comprise, for example, a laser diode.

The collimator lens 150 converts the laser light emitted from the laser light source 140 into parallel light which irradiates the phase-modulation spatial light modulating element 120. The phase-modulation spatial light modulating element 120 phase-modulates the parallel light to deliver phase-modulated light.

The Fourier transform lens 160 Fourier-transforms the phase-modulated light into Fourier-transformed light and collects the Fourier-transformed light into the aperture 170. The projection lens 180 projects the Fourier-transformed light collected by the Fourier transform lens 160 as projected light 190 to the outside.

As described above, by using the structure of the receiving device 100, it is possible to configure the transmitting/receiving device 400 comprising the configuration of the receiving device 100 of the first example embodiment.

Second Example Embodiment

Figure 8:
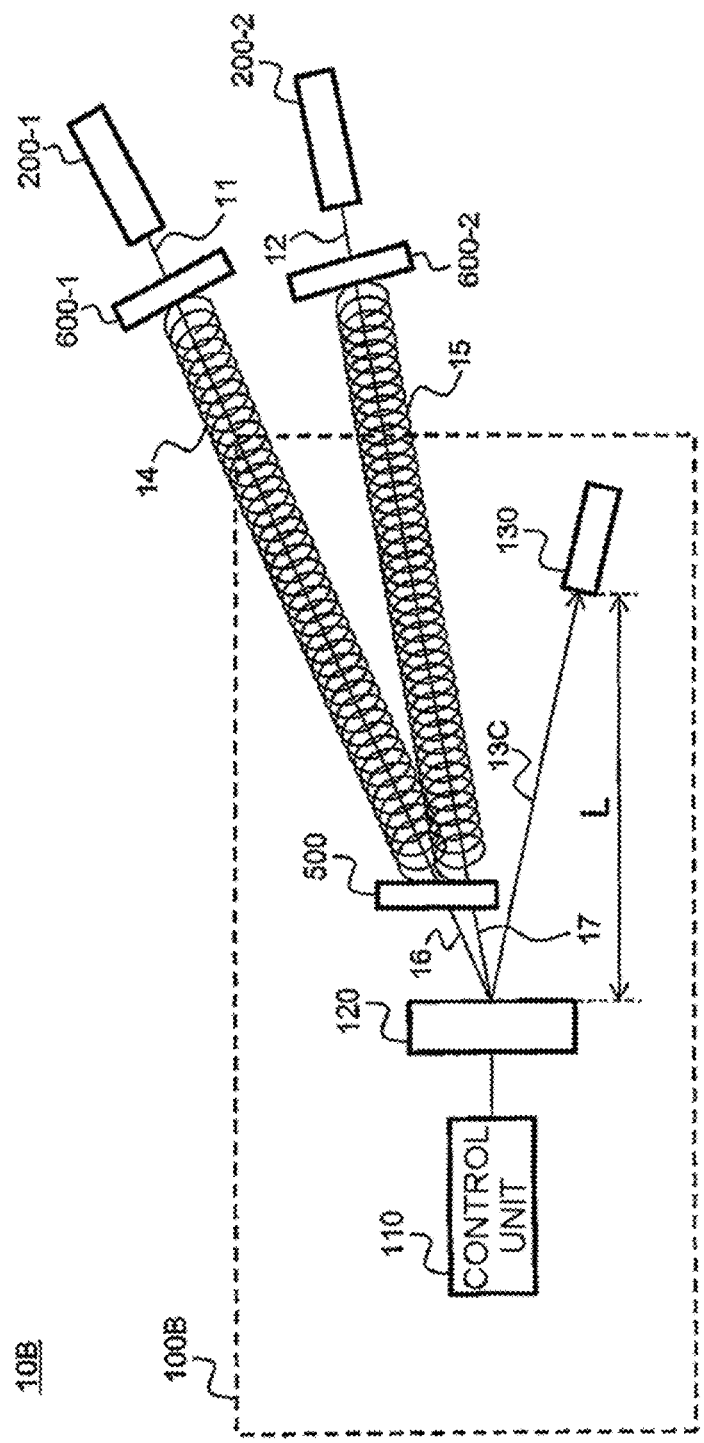
FIG. 8 is a schematic diagram for illustrating a configuration of a communication system according to a second example embodiment of the present invention.

FIG. 8 is a schematic diagram for illustrating a configuration of a communication system according to a second example embodiment of the present invention. The communication system 10B comprises a receiving device 100B, the first transmitter 200-1, the second transmitter 200-2, a first transmission polarizing element 600-1, and a second transmission polarizing element 600-2. The receiving device 100B comprises the control unit 110, the phase-modulation spatial light modulating element 120, the detector 130, and a reception polarizing element 500. In comparison with the receiving device 100 according to the first example embodiment, the receiving device 100B is a receiving device which is capable of communicating without depending on a relative position between the transmitter and the receiving device and on a posture of the transmitter or the receiving device. Hereinafter, description will proceed to only those points different from the first example embodiment of the present invention.

The first transmission polarizing element 600-1 and the second transmission polarizing element 600-2 are provided in the first transmitter 200-1 and the second transmitter 200-2, respectively.

The first transmission polarizing element 600-1 converts the first signal light 11 with linear polarized wave into first circularly polarized signal light 14. In addition, the first transmission polarizing element 600-1 transmits the first circularly polarized signal light 14 toward the receiving device 100B. The second transmission polarizing element 600-2 converts the second signal light 12 with linear polarized wave into second circularly polarized signal light 15. In addition, the second transmission polarizing element 600-2 transmits the second circularly polarized signal light 15 toward the receiving device 100B. As each of the first transmission polarizing element 600-1 and the second transmission polarizing element 600-2, a quarter wavelength plate having an optical axis aligned with a direction of linear polarization of a signal may be used. By using such a quarter wavelength plate, it is possible to convert the signal light with linear polarized wave into the signal light with circular polarized wave.

The reception polarizing element 500 receives, in the receiving device 100B, the first circularly polarized signal light 14 and the second circularly polarized signal light 15 and converts them into first linearly polarized signal light 16 and second linearly polarized signal light 17, respectively. Specifically, as the reception polarizing element 500, a quarter wavelength plate having an optical axis aligned with a direction of linear polarization of the phase-modulation spatial light modulating element 120 may be used. By providing such a quarter wavelength plate, the phase-modulation spatial light modulating element 120 can always receive the signal light having a desired polarization direction without depending on the position of the transmitter. Thus, the phase-modulation spatial light modulating element 120 can repress signal attenuation caused by a reason such that the received signal light cannot be diffracted, or the like. In addition, in this example embodiment, the phase-modulation spatial light modulating element 120 selectively diffracts and collects, toward the detector 130, the first linearly polarized signal light 16 with linear polarized wave and the second linearly polarized signal light 17 with linear polarized wave, both of which are converted by the reception polarizing element 500.

[Operation of Communication System according to Second Example Embodiment]

Figure 9:
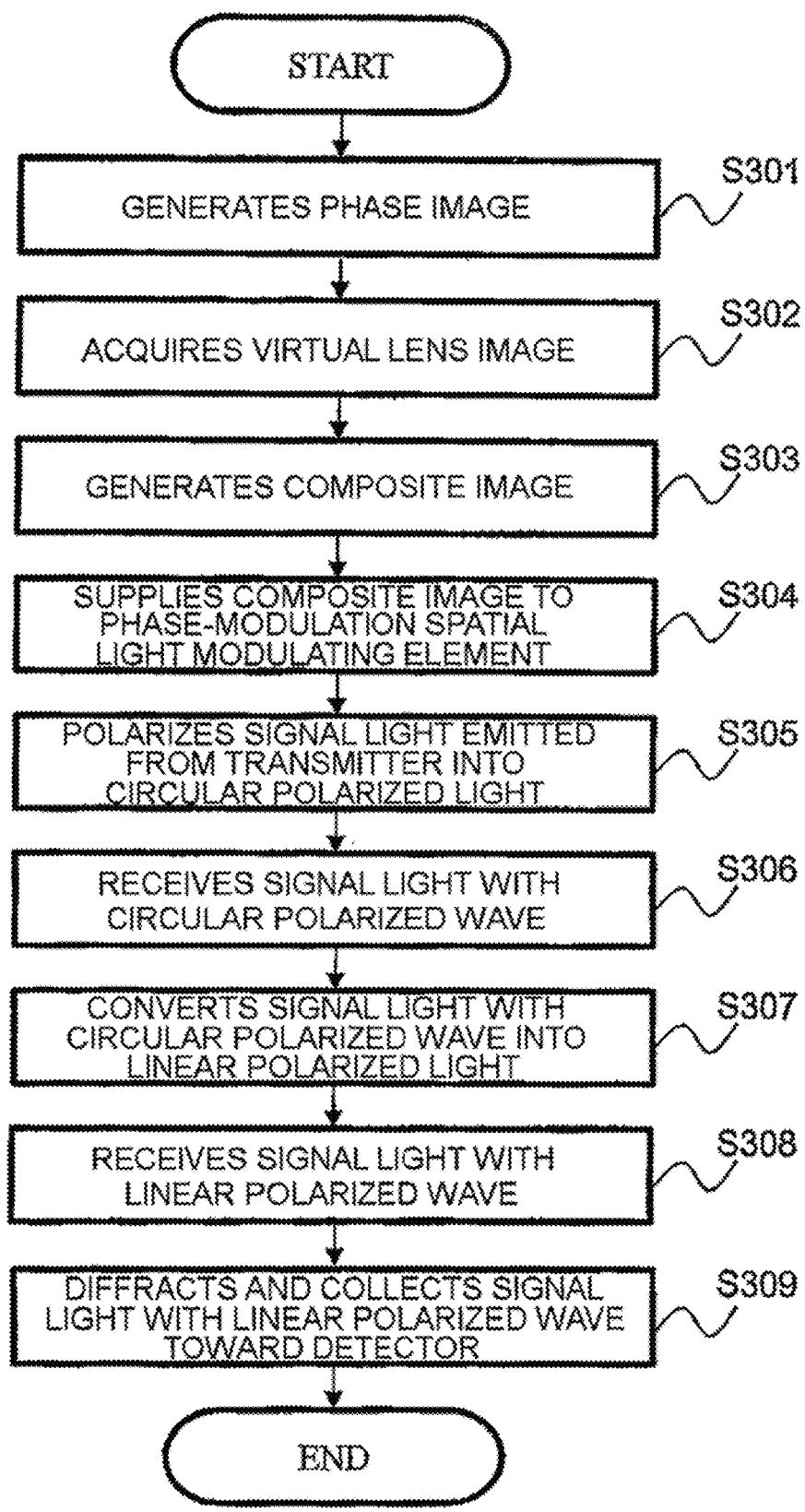
FIG. 9 is a flow chart for illustrating a flow of an operation of the communication system according to the second example embodiment of the present invention.

FIG. 9 is a flow chart for illustrating a flow of an operation of the communication system according to the second example embodiment of the present invention. Referring now to FIGS. 8 and 9, description will proceed to the flow of the operation of the communication system Steps S301 to S304 correspond to the steps S101 to S104 illustrated in FIG. 4, respectively, and therefore description thereof will be omitted.

Next, the first transmission polarizing element 600-1 and the second transmission polarizing element 600-2 convert the first signal light 11 with linear polarized wave and the second signal light 12 with linear polarized wave, which are emitted from the first transmitter 200-1 and the second transmitter 200-2, into the first circularly polarized signal light 14 with circular polarized wave and the second circularly polarized signal light 15 with circular polarized wave, respectively (step S305).

Next, the reception polarizing element 500 receives the first circularly polarized signal light 14 and the second circularly polarized signal light 15 (step S306). Subsequently, the reception polarizing element 500 converts the first circularly polarized signal light 14 and the second circularly polarized signal light 15 into the first linearly polarized signal light 16 and the second linearly polarized signal light 17, respectively, each having a linear polarized wave which matches the polarization direction of the phase-modulation spatial light modulating element 120 (step S307).

Next, the phase-modulation spatial light modulating element 120 receives the first linearly polarized signal light 16 and the second linearly polarized signal light 17 (step S308). Then, the phase-modulation spatial light modulating element 120 selectively diffracts and collects the first linearly polarized signal light 16 and the second linearly polarized signal light 17 toward the detector 130 (step S309).

As stated above, the receiving device 100B can always receive the signal light with desired linear polarized wave and, therefore, can receive the signal light emitted from the transmitter without depending on the relative position between the transmitter and the receiving device and on the posture of the transmitter or the receiving device.

Third Example Embodiment

Figure 10:
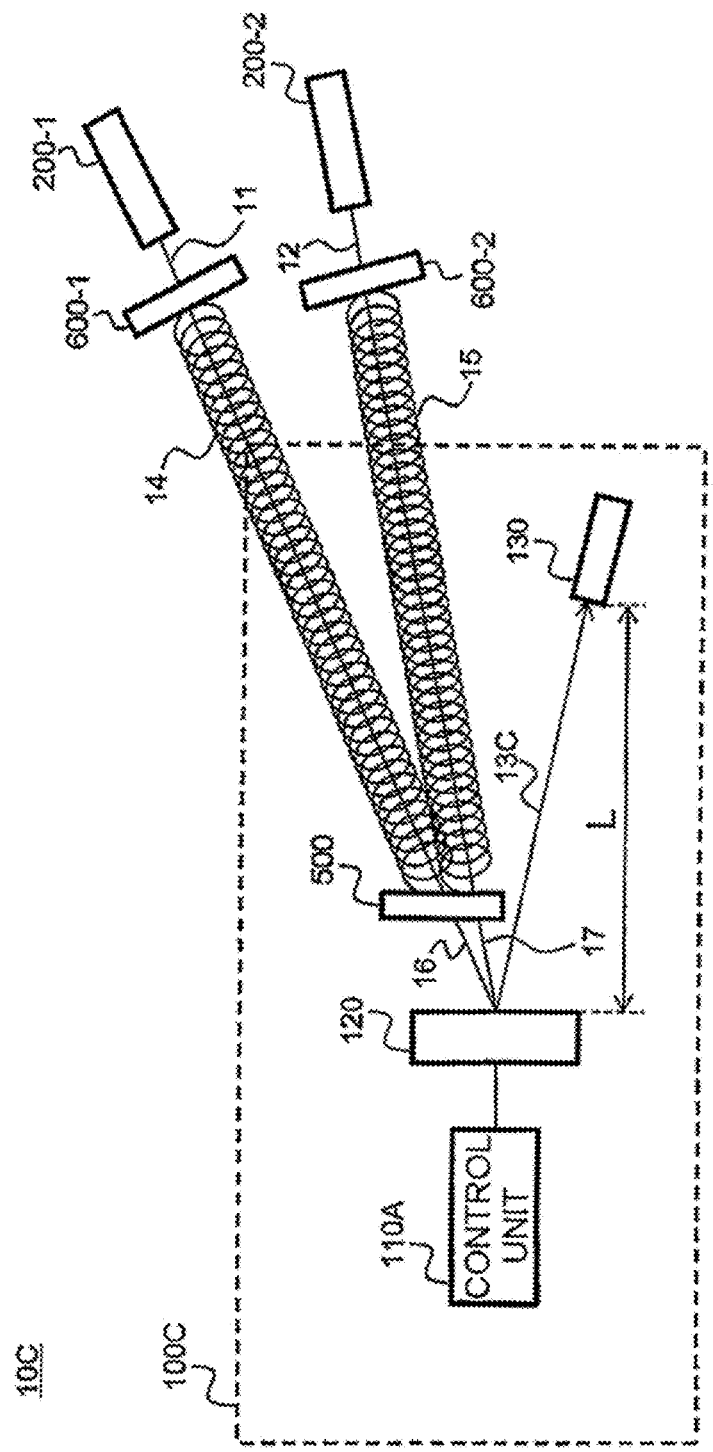
FIG. 10 is a schematic diagram for illustrating a configuration of a communication system according to a third example embodiment of the present invention.

FIG. 10 is a schematic diagram for illustrating a configuration of a communication system according to a third example embodiment of the present invention. A communication system 10C comprises a receiving device 100C, the first transmitter 200-1, the second transmitter 200-2, the first transmission polarizing element 600-1, and the second transmission polarizing element 600-2. The receiving device 100C comprises a control unit 110A, the phase-modulation spatial light modulating element 120, the detector 130, and the reception polarizing element 500. When the receiving device 100B according to the second example embodiment and the receiving device 100C are compared, only the configurations of the control units are different from each other.

Specifically, the control unit 110A is different from the control unit 110 in the receiving device 100 and the receiving device 100A in that it does not comprise the storage unit for holding the virtual lens image and the composite image generation unit for combining the phase image with the virtual lens image.

Operation of Communication System According to Third Example Embodiment

Figure 11:
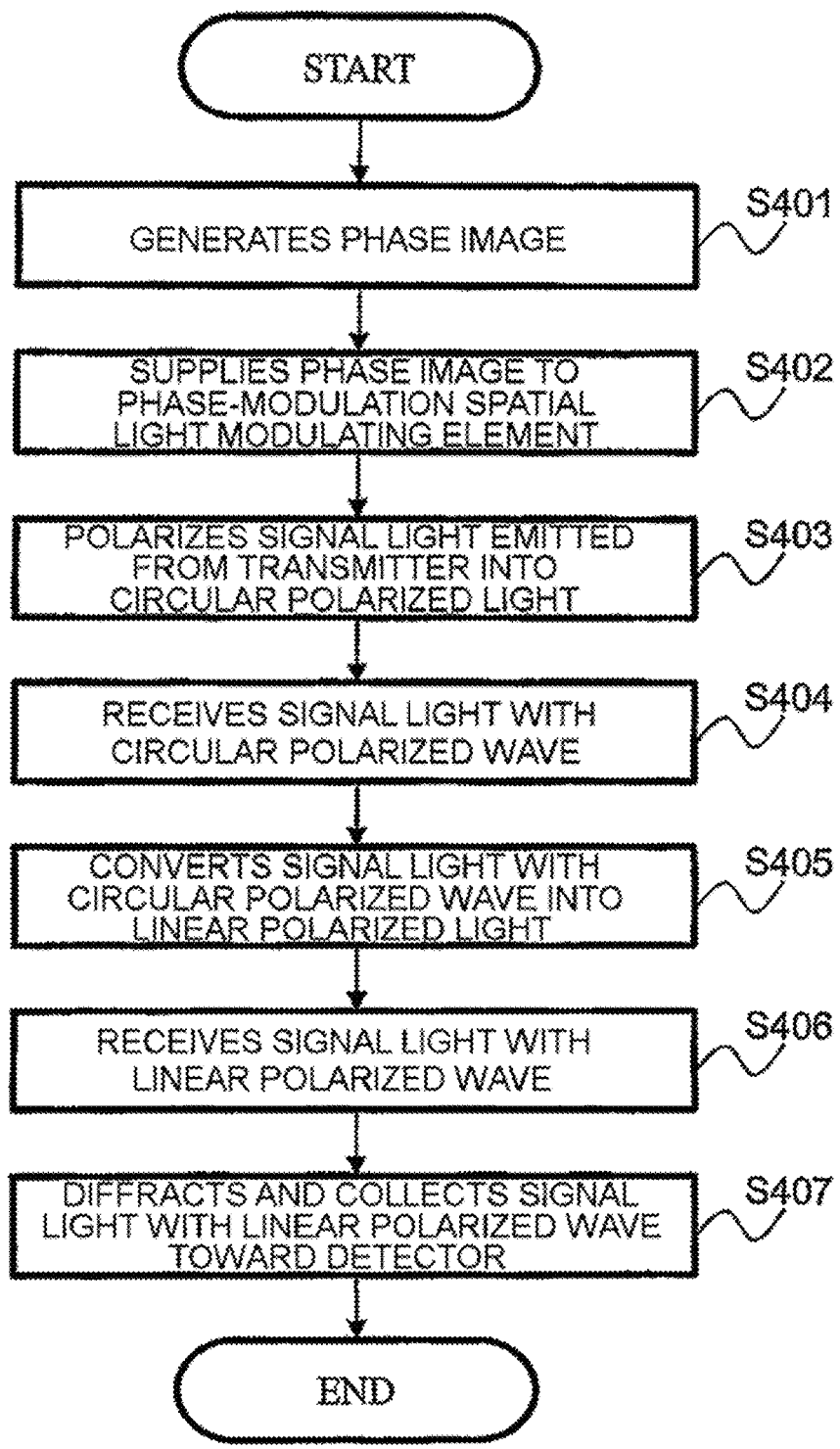
FIG. 11 is a flow chart for illustrating a flow of an operation of the communication system according to the third example embodiment of the present invention.

FIG. 11 is a flow chart for illustrating a flow of an operation of the communication system 10C according to the third example embodiment of the present invention. Hereinafter, referring to FIGS. 9 and 11, description will proceed to the flow of the operation of the communication system 10C.

First, the control unit 110A generates the phase image on the basis of the position information of the first transmitter 200-1 and the second transmitter 200-2 (step S401). Subsequently, the control unit 110A supplies the generated phase image to the phase-modulation spatial light modulating element 120 (step S402).

Next, the first transmission polarizing element 600-1 and the second transmission polarizing element 600-2 convert the first signal light 11 with linear polarized wave and the second signal light 12 with linear polarized wave, which are emitted from the first transmitter 200-1 and the second transmitter 200-2, respectively, into the first circularly polarized signal light 14 with circular polarized wave and the second circularly polarized signal light 15 with circular polarized wave, respectively (step S403).

Next, the reception polarizing element 500 receives the first circularly polarized signal light 14 and the second circularly polarized signal light 15 (step S404). Subsequently, the reception polarizing element 500 converts the first circularly polarized signal light 14 and the second circularly polarized signal light 15 into the first linearly polarized signal light 16 and the second linearly polarized signal light 17, respectively, each having a linear polarized wave which matches the polarization direction of the phase-modulation spatial light modulating element 120 (step S405).

Next, the phase-modulation spatial light modulating element 120 receives the first linearly polarized signal light 16 and the second linearly polarized signal light 17 (step S406). Then, the phase-modulation spatial light modulating element 120 selectively diffracts and collects the first linearly polarized signal light 16 and the second linearly polarized signal light 17 toward the detector 130 (step S407).

[Hardware Configuration]

The receiving device according to the example embodiments of the present invention may be implemented by hardware or may be implemented by software. In addition, the receiving device may be implemented by a combination of hardware and software.

Figure 12:
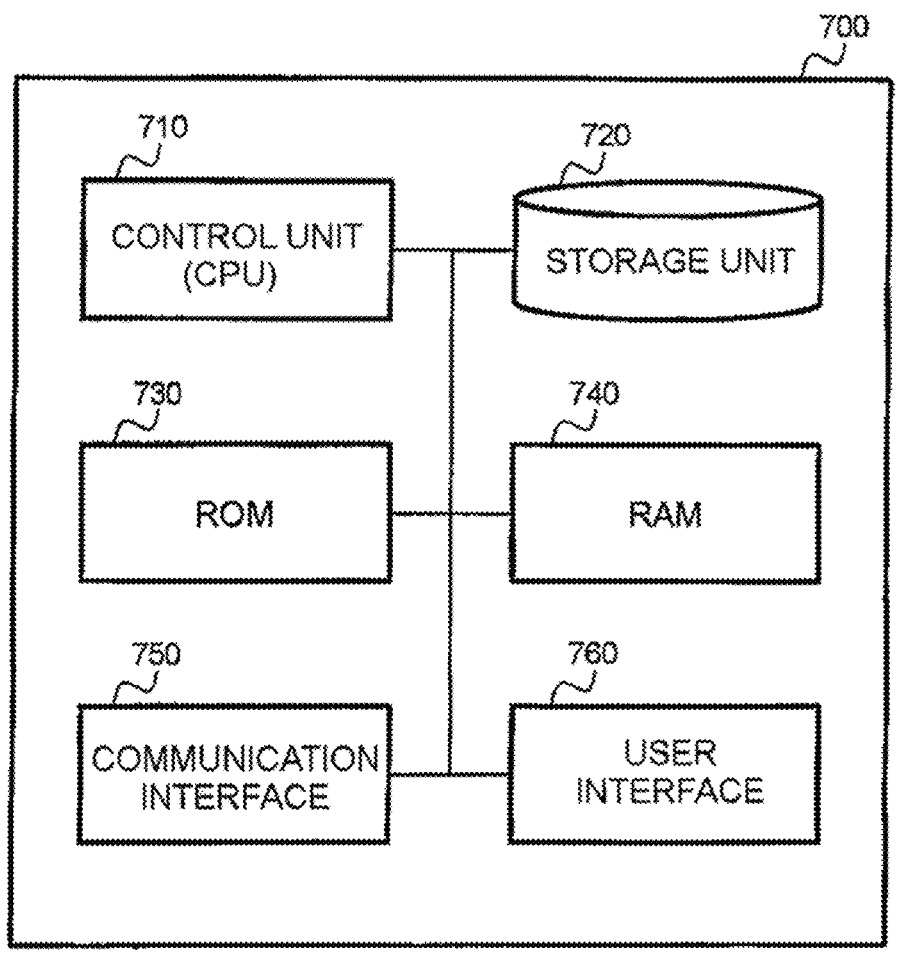
FIG. 12 is a block diagram for illustrating an example of a hardware configuration of a receiving device according to each example embodiment of the present invention.

FIG. 12 is a block diagram for illustrating one example of an information processing apparatus (computer) constituting the receiving device.

As shown in FIG. 12, the information processing apparatus 700 comprises a control unit (CPU: Central Processing Unit) 710, a storage unit 720, an ROM (Read Only Memory) 730, an RAM (Random Access Memory) 740, a communication interface 750, and a user interface 760.

The control unit (CPU) 710 may implement various functions of the receiving device by developing, in the RAM 740, a program held in the storage unit 720 or the ROM 730 and by executing the program. In addition, the control unit (CPU) 710 may comprise an internal buffer which is adapted to temporarily store data or the like.

The storage unit 720 comprises a large-capacity storage medium which can hold various types of data and may be implemented by a storage medium such as an HDD (Hard Disk Drive), an SSD (Solid State Drive), and so on. The storage unit 720 may be a cloud storage existing in a communication network when the information processing apparatus 700 is connected to the communication network via the communication interface 750. The storage unit 720 may hold the program readable by the control unit (CPU) 710.

The ROM 730 comprises a nonvolatile storage device which may be constituted by a flash memory having a small capacity as compared to the storage unit 720. The ROM 730 may hold a program which is readable by the control unit (CPU) 710. The program readable by the control unit (CPU) 710 may be held in at least one of the storage unit 720 and the ROM 730.

The program readable by the control unit (CPU) 710 may be supplied to the information processing apparatus 700 in a state where it is non-transitorily stored in various storage media readable by the computer. Such storage media may be, for example, a magnetic tape, a magnetic disk, a magneto-optical disc, a CD-ROM, a CD-R, a CD-R/W, and a semiconductor memory.

The RAM 740 comprises a semiconductor memory such as a DRAM (Dynamic Random Access Memory) and an SRAM (Static Random Access Memory) and may be used as an internal buffer which temporarily stores data and so on.

The communication interface 750 is an interface which connects the information processing apparatus 700 and the communication network via wire or wirelessly.

The user interface 760 comprises, for example, a displaying unit such as a display and an input unit such as a keyboard, a mouse, and a touch panel.

The whole or part of the above-mentioned example embodiments can be described as, but not limited to, the following supplementary notes.

[Supplementary Note 1]

A receiving device configured to receive signal light emitted from a transmitter, the receiving device comprising:

a control unit configured to generate a phase image on the basis of position information indicating a position of the transmitter, and to combine the phase image with a virtual lens image to generate a composite image;

a phase-modulation spatial light modulating element configured to diffract and collect the signal light in response to the composite image supplied thereto; and a detector configured to receive the diffracted and collected signal light.

[Supplementary Note 2]

The receiving device according to Supplementary Note 1, wherein the control unit comprises:

a phase image generation unit configured to generate the phase image on the basis of the position information;

a storage unit configured to hold the vertical lens image;

a virtual lens image acquiring unit configured to acquire the virtual lens image from the storage unit; and a composite image generation unit configured to combine the phase image with the virtual lens image to generate the composite image.

[Supplementary Note 3]

The receiving device according to Supplementary Note 1 or 2, wherein the detector comprises at least two detection units, wherein the at least two detection units are configured to receive rays of signal light having wavelength bands which are different from each other.

[Supplementary Note 4]

A communication system comprising:

the receiving device according to any one of Supplementary Notes 1 to 3; and at least one transmitter configured to emit signal light to the receiving device.

[Supplementary Note 5]

A receiving method of receiving signal light emitted from a transmitter, the receiving method comprising:

generating a phase image on the basis of position information indicating a position of the transmitter, combining the phase image with a virtual lens image to generate a composite image, and supplying the composite image to a phase-modulation spatial light modulating element;

diffracting and collecting the signal light in the phase-modulation spatial light modulating element; and receiving, in a detector, the diffracted and collected signal light.

[Supplementary Note 6]

The receiving method according to Supplementary Note 5, wherein the generating the composite image comprises:

generating the phase image on the basis of the position information;

holding the virtual lens image;

acquiring the virtual lens image from the storage unit; and combining the phase image with the virtual lens image to generate the composite image.

[Supplementary Note 7]

The receiving method according to Supplementary Note 5 or 6, wherein the detector comprises at least two detection units, wherein the receiving the signal light comprises:

receiving, in the at least two detection units, at least two rays of signal light in different wavelength regions.

[Supplementary Note 8]

A composite image generation program for making a computer generate a composite image, the computer controlling, in a receiving device configured to receive signal light emitted from a transmitter, an operation of a phase-modulation spatial light modulating element for diffracting and collecting the signal light, the composite image generation program making the computer execute:

generation processing for generating a phase image on the basis of position information indicating a position of the transmitter and combining the phase image with a virtual lens image to generate a composite image, and supplying processing for supplying the composite image to the phase-modulation spatial light modulating element.

[Supplementary Note 9]

The composite image generation program according to Supplementary Note 8, wherein the generation processing makes the computer execute:

processing for generating the phase image on the basis of the position information;

processing for holding the virtual lens image in a storage unit;

processing for acquiring the virtual lens image from the storage unit; and processing for combining the phase image with the virtual lens image to generate the composite image.

[Supplementary Note 10]

A receiving device configured to receive circularly polarized signal light emitted from a transmitter, the receiving device comprising:

a polarizing element configured to convert the circularly polarized signal light into linearly polarized signal light;

a control unit configured to generate a phase image on the basis of position information indicating a position of the transmitter, and to combine the phase image with a virtual lens image to generate a composite image;

a phase-modulation spatial light modulating element configured to diffract and collect the linearly polarized signal light in response to the composite image supplied thereto; and a detector configured to receive the diffracted and collected linearly polarized signal light, wherein the polarizing element is configured to convert the circularly polarized signal light into the linearly polarized signal light so as to coincide with a polarizing direction of the phase-modulation spatial light modulating element.

[Supplementary Note 11]

The receiving device according to Supplementary Note 10, wherein the control unit comprises:

a phase image generation unit configured to generate the phase image on the basis of the position information;

a storage unit configured to hold the virtual lens image;

a virtual lens image acquiring unit configured to acquire the virtual lens image from the storage unit; and a composite image generation unit configured to combine the phase image with the virtual lens image to generate the composite image.

[Supplementary Note 12]

The receiving device according to Supplementary Note 10 or 11, wherein the detector comprises at least two detection units, wherein the at least two detection units are configured to receive rays of signal light having wavelength bands which are different from each other.

[Supplementary Note 13]

A communication system comprising:

the receiving device according to any one of Supplementary Notes 10 to 12, and at least one transmitter configured to emit circularly polarized signal light to the receiving device.

[Supplementary Note 14]

A receiving method of receiving circularly polarized signal light emitted from a transmitter, the receiving method comprising:

converting the circularly polarized signal light into linearly polarized signal light having a direction which coincides with a polarization direction of a phase-modulation spatial light modulating element;

generating a phase image on the basis of position information indicating a position of the transmitter, combining the phase image with a virtual lens image to generate a composite image, and supplying the composite image to the phase-modulation spatial light modulating element;

diffracting and collecting the linearly polarized signal light in the phase-modulation spatial light modulating element; and receiving, in a detector, the diffracted and collected linearly polarized signal light.

[Supplementary Note 15]

The receiving method according to Supplementary Note 14, wherein the generating the composite image comprises:

generating the phase image on the basis of the position information;

holding the virtual lens image in a storage unit;

acquiring the virtual lens image from the storage unit; and combining the phase image with the virtual lens image to generate the composite image.

[Supplementary Note 16]

The receiving method according to Supplementary Note 14 or 15, wherein the detector comprises at least two detection units, wherein the receiving the signal light comprises:

receiving, in the at least two detection units, at least two rays of signal light in different wavelength regions.

[Supplementary Note 17]

A receiving device configured to receive circularly polarized signal light emitted from a transmitter, the receiving device comprising:

a polarizing element configured to convert the circularly polarized signal light into linearly polarized signal light;

a control unit configured to generate a phase image on the basis of position information indicating a position of the transmitter;

a phase-modulation spatial light modulating element configured to diffract and collect the linearly polarized signal light in response to the phase image supplied thereto; and a detector configured to receive the diffracted and collected linearly polarized signal light, wherein the polarizing element is configured to convert the circularly polarized signal light into the linearly polarized signal light so as to coincide with a polarization direction of the phase-modulation spatial light modulating element.

[Supplementary Note 18]

A communication system comprising:

the receiving device according to Supplementary Note 17; and at least one transmitter configured to emit circularly polarized signal light to the receiving device.

[Supplementary Note 19]

A receiving method of receiving circularly polarized signal light emitted from a transmitter, the receiving method comprising:

converting the circularly polarized signal light into signal light with linearly polarized signal light having a direction which coincides with a polarization direction of a phase-modulation spatial light modulating element;

generating a phase image on the basis of position information indicating a position of the transmitter, and supplying the phase image to the phase-modulation spatial light modulating element;

diffracting and collecting the linearly polarized signal light in the phase-modulation spatial light modulating element; and receiving the diffracted and collected linearly polarized signal light.

REFERENCE SIGNS LIST 10, 10A, 10B, 10C communication system
11, 11A first signal light
12, 12A second signal light
13, 13C diffracted light
13A first diffracted light
13B second diffracted light
14 first circularly polarized signal light
15 second circularly polarized signal light
16 first linearly polarized signal light
17 second linearly polarized signal light
100, 100A, 100B, 100C receiving device
110, 110A control unit
111 phase image generation unit
112 storage unit
113 virtual lens image acquiring unit
114 composite image generation unit
120 phase-modulation spatial light modulating element
130, 130A detector
131 first detection unit
132 second detection unit
140 laser light source
150 collimator lens
160 Fourier transform lens
170 aperture
180 projection lens
190 projected light
200, 200A transmitter
200-1 first transmitter
200-2 second transmitter
320 phase image
320 virtual lens image
330 composite image
400 transmitting/receiving device
500 reception polarizing element
600-1 first transmission polarizing element
600-2 second transmission polarizing element
700 information processing apparatus
710 control unit (CPU: Central Processing unit)
720 storage unit
730 ROM (Read Only Memory)
740 RAM (Random Access Memory)
750 communication interface
760 user interface

The invention claimed is:

1. A receiving device configured to receive signal light emitted from a transmitter, the receiving device comprising:

a control unit configured to generate a phase image using position information indicating a position of the transmitter, and to combine the phase image with a virtual lens image to generate a composite image;

a phase-modulation spatial light modulating element configured to diffract and collect the signal light in response to the composite image supplied thereto, the phase-modulation spatial light modulating element having a diffraction pattern; and a detector configured to receive the diffracted and collected signal light, wherein the virtual lens image is an image for controlling the diffraction pattern of the phase-modulation spatial light modulating element so as to shorten a focal distance of diffracted light caused by the phase-modulation spatial light modulating element by combining the phase image with the virtual lens image.

2. The receiving device as claimed in claim 1, wherein the control unit comprises:
a phase image generation unit configured to generate the phase image using the positon information;
a storage unit configured to store the virtual lens image;
a virtual lens image acquiring unit configured to acquire the virtual lens image from the storage unit; and
a composite image generation unit configured to combine the phase image with the virtual lens image to generate the composite image.

3. The receiving device as claimed in claim 1, wherein the detector comprises at least two detection units, and
wherein the at least two detection units are configured to receive rays of signal light having wavelength bands which are different from each other.

4. A communication system comprising:
the receiving device as claimed in claim 1; and
at least one transmitter configured to emit signal light to the receiving device.

5. The receiving device as claimed in claim 1, wherein the receiving device is configured to receive, as the signal light, circularly polarized signal light emitted from the transmitter,
wherein the receiving device further comprises:
a polarizing element configured to convert the circularly polarized signal light into linearly polarized signal light,
wherein the phase-modulation spatial light modulating element is configured to diffract and collect the linearly polarized signal light in response to the composite image supplied thereto,
wherein the detector is configured to receive the diffracted and collected linearly polarized signal light, and
wherein the polarizing element is configured to convert the circularly polarized signal light into the linearly polarized signal light so as to coincide with a polarizing direction of the phase-modulation spatial light modulating element.

6. The receiving device as claimed in claim 5, wherein the control unit comprises:
a phase image generation unit configured to generate the phase image using the positon information;
a storage unit configured to store the virtual lens image;
a virtual lens image acquiring unit configured to acquire the virtual lens image from the storage unit; and
a composite image generation unit configured to combine the phase image with the virtual lens image to generate the composite image.

7. The receiving device as claimed in claim 5, wherein the detector comprises at least two detection units, and
wherein the at least two detection units are configured to receive rays of signal light having wavelength bands which are different from each other.

8. A communication system comprising:
the receiving device as claimed in claim 5; and
at least one transmitter configured to emit circularly polarized signal light to the receiving device.

9. A receiving method of receiving signal light emitted from a transmitter, the receiving method comprising:
generating a phase image using position information indicating a position of the transmitter, combining the phase image with a virtual lens image to generate a composite image; and
supplying the composite image to a phase-modulation spatial light modulating element having a diffraction pattern;
diffracting and collecting the signal light in the phase-modulation spatial light modulating element; and
receiving, in a detector, the diffracted and collected signal light,
wherein the virtual lens image is an image for controlling the diffraction pattern of the phase-modulation spatial light modulating element so as to shorten a focal distance of diffracted light caused by the phase-modulation spatial light modulating element by combining the phase image with the virtual lens image.

10. The receiving method as claimed in claim 9, wherein the generating the composite image comprises:
generating the phase image using the position information;
storing the virtual lens image in a storage unit;
acquiring the virtual lens image from the storage unit; and
combining the phase image with the virtual lens image to generate the composite image.

11. The receiving method as claimed in claim 9, wherein the detector comprises at least two detection units, and
wherein the receiving method further comprises:
receiving, in the at least two detection units, at least two rays of signal light in different wavelength regions.

12. The receiving method as claimed in claim 9, wherein the receiving method receives, as the signal light, circularly polarized signal light emitted from the transmitter, the receiving method further comprising:
converting the circularly polarized signal light into linearly polarized signal light having a direction which coincides with a polarization direction of the phase-modulation spatial light modulating element,
wherein the diffracting and collecting is diffracting and collecting the linearly polarized signal light in the phase-modulation spatial light modulating element, and
wherein the receiving is receiving, in the detector, the diffracted and collected linearly polarized signal light.

13. The receiving method as claimed in claim 12, wherein the generating the composite image comprises:
generating the phase image using the position information;
storing the virtual lens image in a storage unit;
acquiring the virtual lens image from the storage unit; and
combining the phase image with the virtual lens image to generate the composite image.

14. The receiving method as claimed in claim 12, wherein the detector comprises at least two detection units, and
wherein the receiving method further comprises:
receiving, in the at least two detection units, at least two rays of signal light in different wavelength regions.

15. A non-transitory computer readable recording medium recording a composite image generation program for making a computer generate a composite image, the computer controlling, in a receiving device configured to receive signal light emitted from a transmitter, an operation of a phase-modulation spatial light modulating element for diffracting and collecting the signal light, the phase-modulation spatial light modulating element having a diffraction pattern, the composite image generation program, if executed, making the computer execute:
generation processing for generating a phase image using position information indicating a position of the transmitter and combining the phase image with a virtual lens image to generate a composite image; and
supplying processing for supplying the composite image to the phase-modulation spatial light modulating element, wherein the virtual lens image is an image for controlling the diffraction pattern of the phase-modulation spatial light modulating element so as to shorten a focal distance of diffracted light caused by the phase-modulation spatial light modulating element by combining the phase image with the virtual lens image.

16. The non-transitory computer readable recording medium as claimed in claim 15, wherein the generation processing comprises:

processing for generating the phase image using the position information;

processing for storing the virtual lens image in a storage unit;

processing for acquiring the virtual lens image from the storage unit; and processing for combining the phase image with the virtual lens image to generate the composite image.

* * * * *